Jan. 13, 1959    J. E. PETRI    2,868,862
SEALED CASINGS FOR CRYSTAL ELEMENTS
Filed Oct. 12, 1953    3 Sheets-Sheet 2
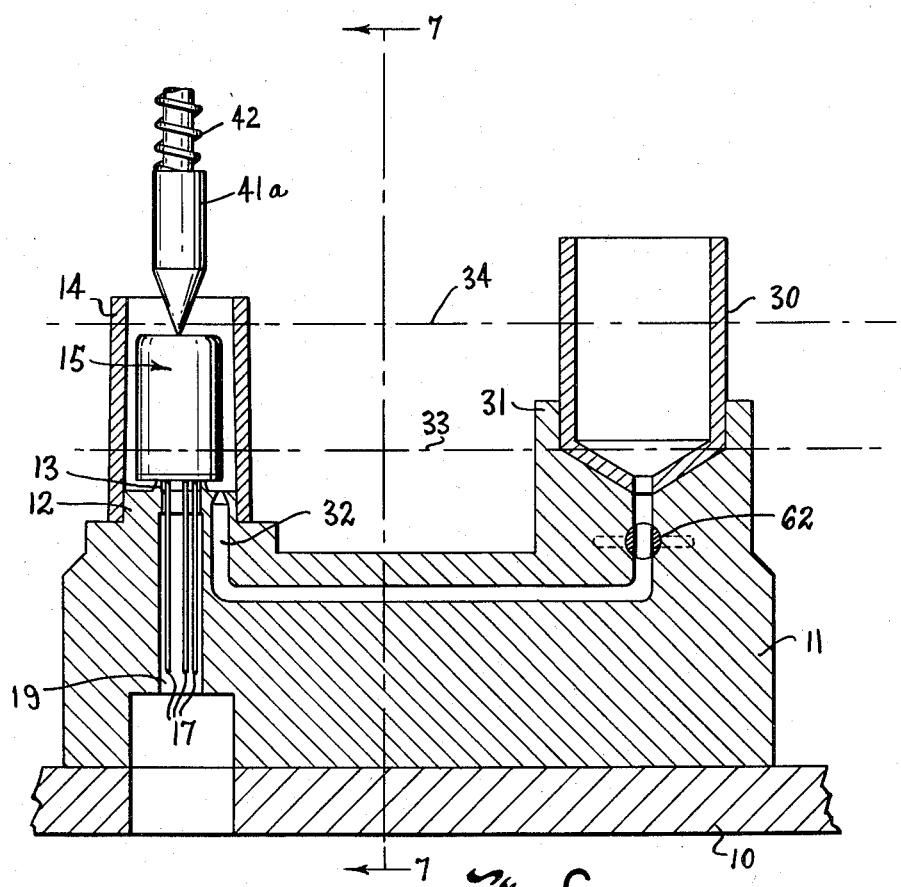
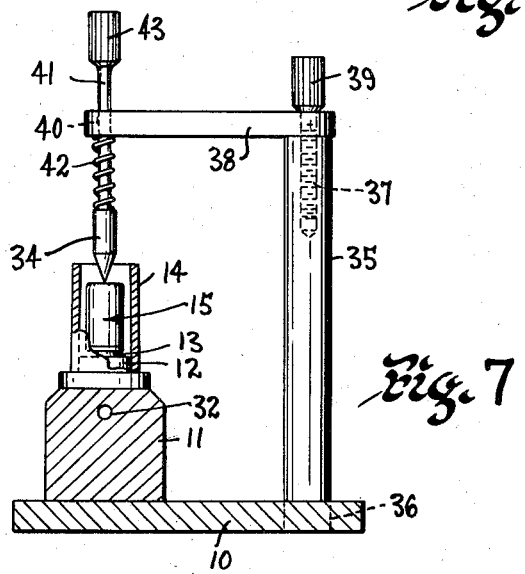
INVENTOR
JAN E. PETRI
BY
Louis L. Gagnon
ATTORNEY Jan. 13, 1959   J. E. PETRI   2,868,862
SEALED CASINGS FOR CRYSTAL ELEMENTS
Filed Oct. 12, 1953   3 Sheets-Sheet 3

INVENTOR
JAN E. PETRI
BY
*Louis L. Gagnon*
ATTORNEY

United States Patent Office 2,868,862
Patented Jan. 13, 1959

2,868,862

SEALED CASINGS FOR CRYSTAL ELEMENTS

Jan E. Petri, Pomfret, Conn., assignor to American Optical Company, Southbridge, Mass., a voluntary association of Massachusetts Application October 12, 1953, Serial No. 385,583

3 Claims. (Cl. 174—50.57)

This invention relates to improvements in means and method of providing light- and heat-sensitive crystal elements such as used in transistors with sealed protective casings, and has particular reference to the provision of novel means and method of forming such casings.

Transistors are comprised primarily of germanium crystals having a plurality of leads attached thereto, the leads, in a common type of transistor, for example, consisting of a base lead, an emitter lead and a collector lead. Germanium crystals, however, are known to be extremely sensitive to many atmospheric and other conditions and are particularly sensitive to humidity, heat and oxygen. In addition, they are also extremely light sensitive. Therefore, in order to provide a germanium crystal with a long and efficient life, it is necessary to provide the crystal with a casing to prevent the crystal from being subject to the conditions which affect it adversely.

It is accordingly, one of the primary objects of this invention to provide novel means and method of enclosing a crystal element of the above character with a casing which is impermeable to moisture, light, heat, oxygen and the like.

Another object is to provide novel means and method of enclosing a germanium or other crystal in a protective casing wherein leads attached to the crystal are extended outwardly of the casing.

Another object is to provide a crystal element with a sealed glass housing comprising a base portion to which is cemented the major portion of the housing, and having a metallic casing disposed entirely or partially over the glass housing particularly in the area of the cement to prevent the cement from deterioration by atmospheric conditions.

A further object is to provide a crystal element of the above character wherein the glass housing functions efficiently as a heat, moisture and oxygen barrier and the metal casing functions to prevent entrance of light.

A still further object is to provide an article of the above character which may be easily coated with a suitable opaque substance to further provide means for preventing entrance of light into the structure.

Other objects and advantages of the invention will become apparent from the following description taken in connection with the accompanying drawings, in which:

Fig. 6 is a transverse vertical sectional view through the device illustrating the method of molding a metal casing over the glass housing of the unit;

Fig. 7 is a vertical sectional view of the device taken substantially on line 7—7 of Fig. 6;

Figure 1:
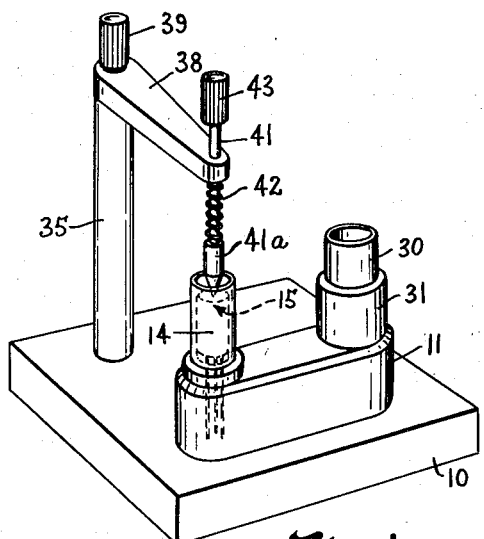
Fig. 1 is a perspective view of a preferred embodiment of the invention.

Referring more particularly to the drawings wherein like characters of reference designate like parts throughout the several views, the illustrated embodiment of the invention comprises a base 10 upon which is located a pedestal 11, as shown in Figs. 1, 6 and 7. The base 10 in the preferred construction is formed of any suitable relatively heavy material such as metal while the pedestal may be formed of metal or a durable plastic material such as nylon.

One end of the pedestal 11 is provided with an upright cylindrical portion 12 which tapers upwardly and slightly inwardly and which has an annular raised portion or ring 13 formed integral on its upper surface. It is conceivable that the upright portion 12 and ring 13 may be formed separately if desired and may be attached to the pedestal 11 by any suitable attachment means not shown. The upright portion 12 is of a predetermined diameter substantially the same as the inner diameter of a nylon or metal sleeve 14. The sleeve 14 has an upwardly and slightly inwardly tapering inner wall the lower end of which is adapted to fit snugly over said upright portion 12.

Figure 3:
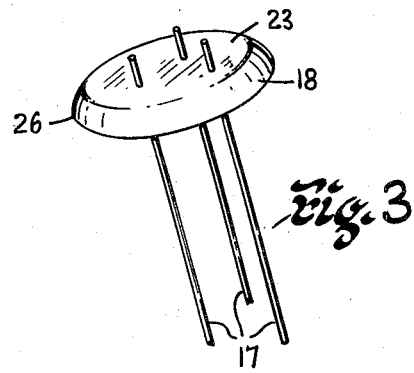
Fig. 3 is a perspective view of the base of a transistor housing.
Figure 4:
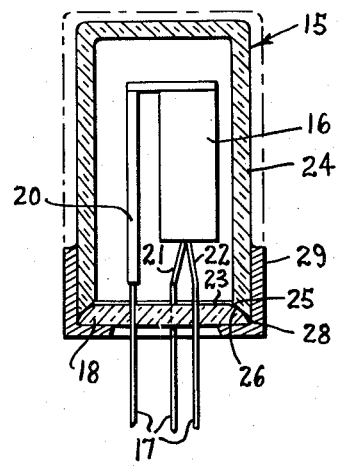
Fig. 4 is a vertical section through a sealed unit.

Upon the ring 13 is positioned one end of a glass housing 15 which contains a germanium or other crystal 16 (Fig. 4) having its leads 17 extending through the base portion 18 of the glass housing 15 and through the central opening in the ring 13 into a cavity 19 provided therefor in the pedestal 11. The crystal 16 may be any one of several types which are available and the type illustrated in Fig. 4 is only an example of one type having three leads extending therefrom, namely a base lead 20, a collector 21, and an emitter 22 to each of which are soldered or otherwise suitably attached the respective wires or leads 17. The leads 17 are carried by the base portion 18 of the glass housing 15, (Figs. 3 and 4) preferably being placed within the material thereof at the time the base portion 18 is molded or otherwise formed, and are adapted to extend slightly above the upper surface 23 of the base portion only a slight amount sufficient to permit easy soldering, the major portions of the leads 17 extend below the base portion 18 a desired length.

Figure 5:
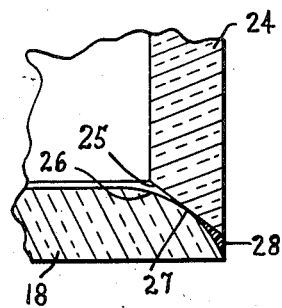
Fig. 5 is an enlarged sectional view illustrating the method of joining a base to a housing.

The upper portion 24 of the glass housing 15 comprises cylindrical side walls having one end sealed. The open end thereof is adapted to fit over the crystal 16 and seat upon the base portion 18. The inner peripheral edge of the open end of the upper portion 24 is beveled as indicated at 25 in Figs. 4 and 5 and is adapted to be engaged by angled and rounded upwardly disposed peripheral edge 26 of the base portion 18. The surfaces 25 and 26 are preferably fine ground or polished and thus there is provided an intimate continuous line contact throughout the engaging surfaces as indicated at 27 in Fig. 5. Such continuous line contact effectively seals the entrance into the chamber or interior of the glass housing.

To irremovably secure the base portion 18 to the upper portion 24, a glass cement 28 is used. Although many glass cements are available, it is important to select a cement which not only has efficient bonding characteristics but also has a co-efficient of expansion substantially the same as the glass comprising the housing 15 and also has a relatively high degree of water resistance. Such a cement can be produced of a composition containing a controlled amount of resin formed of the polymer of diethylene glycol and maleic acid cross-linked with diallyl phthalate having added thereto an amount of hydrophobic plasticizer which is compatible therewith over a wide range of temperatures. A satisfactory formula for such a cement comprises from approximately 75–85% of such a resin and 15–25% of tricresyl phosphate or cresyl diphenyl phosphate. Before using the cement a catalyst is added to promote curing and after application it is cured by subjection to ultra-violet radiation or by heating, for example, at 110° C. for 2 hours.

In assembling a housing, the cement 28 is applied to the parts while retained in an inert atmosphere such as nitrogen or the like and is allowed to penetrate the outer space between the two edges 25 and 26 up to the line of contact 27. Thus, since the line of contact 27 forms a barrier, no organic material can enter the interior of the housing 15. With such a construction it is also apparent that substantially no moisture or oxygen can enter the housing 15. Since glass is also well known as an insulation, it is apparent that the crystal 16 will be substantially unaffected by heat.

Figure 2:
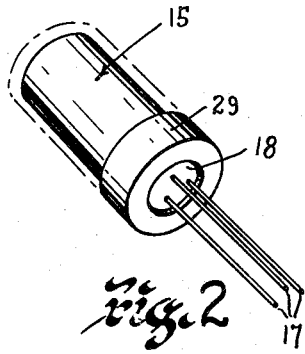
Fig. 2 is a perspective view of a completed transistor unit.

To prevent the breakdown of the cement by atmosphere, the housing 15 is provided with a metal shell or casing 29 (Figs. 2 and 4) which may enclose only the end of the housing over the cement 28 or may enclose the entire housing as shown by dot-dash lines in Figs. 2 and 4. In either case, the metal casing 29 is not applied to the base portion 18 adjacent the leads 17. The metal casing 29 is formed preferably of a low melting alloy such as a mixture of approximately equal parts of indium and tin, and which has a melting point of approximately 135° C. The metal will "wet" the glass and adhere closely thereto in overlying relation with the cement 28 and thus will prevent the atmosphere from contacting the cement 28. When the metal casing 29 overlies only the end of the housing having the cement 28 thereon the remaining portions of the housing not covered by the metal may have applied thereto an opaque plastic coating as by dipping, spraying or the like. This coating, if desired, can also extend over the metal coating.

With a full casing around the glass housing, there is provided a structure which is rugged and durable and which prevents light form entering the housing. The uncovered base portion 18 and the uncovered glass in the upper portion 24 of the housing 15 can be easily made opaque by subsequently dipping, spraying or otherwise applying an opaque plastic or lacquer coating thereon.

The method of forming a metal casing 29 on the glass housing 15 is illustrated in Figs. 6 and 7. A reservoir or tank 30, formed of any suitable material, such as a metal which can be melted at only a relatively high temperature in comparison to the melting point of the metal casing 29, is provided on a second upright 31 on the pedestal 11. A conduit 32 is provided in the pedestal 11 with one end connected to the lower end of the tank 30 and with its opposed end communicating with the space beneath the housing 15 and between the outer surface of the ring 13 and inner surface of the sleeve 14.

The metal is placed in the tank 30 and when melted is allowed to flow by gravital force through the conduit 32 into the interior of the sleeve 14. It will flow around the glass housing 15 and to a controlled height thereon in accordance with the level of the liquid metal in the tank 30. For example, if a metal casing 29 of the type shown in Figs. 2 and 4 is desired, the level of the liquid metal in the tank 30 is held substantially at line 33 whereupon, as it flows and seeks to find its own level, the liquid in sleeve 14 will also rise to line 33. If a full casing 29, as indicated by dot-dash lines in Figs. 2 and 4, is desired the level of the liquid in the tank 30 is held substantially at line 34 whereupon the liquid in the sleeve 14 will cover the top of the glass housing 15. The ring 13 prevents the metal from reaching the leads 17. The liquid metal is subsequently allowed to cool and harden whereupon it will form a snug protective casing for the housing 15. If desired, a manually manipulatable valve 62 may be provided in the conduit 32 to control level of the liquid metal.

To hold the glass housing 15 in place during the foregoing operations, a pointed stud 41a is placed in engagement with the upper end of the housing 15, as shown in Figs. 6 and 7. A post 35 is screwed, press fitted or otherwise fixedly located in an opening 36 in the base 10 and carries a threaded pivot member 37 in its upper end. The pivot member 37 extends freely through one end of an arm 38, the other end of which is adapted to overlie the upper end of the sleeve 14. The pivot stud 37 carries a knob 39 by which it may be threaded into the post 35 to clamp the arm 38 firmly in desired adjusted position. The outer end of the arm has a vertical opening 40 which slidably receives a shaft 41 to the lower end of which is fixedly secured the pointed stud 41a. A spring 42 is mounted on the shaft 41 between the arm 38 and stud 41a and functions to constantly urge the stud 41a in a direction toward the housing 15. By means of a knob 43 on the upper end of the shaft 41, the stud 41a can be raised against the tension of spring 42 while a housing is being positioned upon the ring 13 and then released to contact the adjacent end of the housing 15 and thus hold it in place.

It is to be understood that if desired a screw type or other device may be used to position the stud 41a against housing 15. Although the foregoing description and the drawings refer to a fixture for applying a metal casing to a single housing, it is to be further understood that if desired means may be provided for supporting a plurality of glass housings on a base for simultaneous encasement in a metal casing from a supply of liquid metal contained in a single reservoir.

Although the base portion 18 of the glass housing has been described as having a rounded upper peripheral edge 26 to which is cemented the flat angled end surface 25 of the housing 15, it is apparent that the surface shapes may be reversed and other methods of cementing the two adjacent surfaces together may be used.

Figure 9:
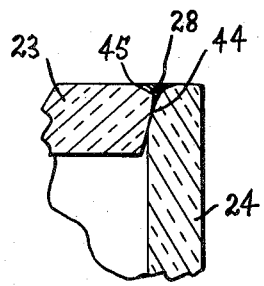
Fig. 9 is an enlarged sectional view illustrating a modified method of joining a base to a housing.

Another method is shown in Fig. 9 wherein the inner peripheral edge of the open end of the housing 24 is provided with a relatively finely ground or polished, relatively flat beveled surface 44 which is at only a slight angle with respect to the vertical, for example, approximately 15°. The peripheral edge 45 of the base portion 23 is also relatively finely ground or polished so as to have a desired surface and is so inclined that the base portion 23 is disposed within the end of the glass housing 24 with the tapered edge 45 thereof fitting intimately upon the beveled surface 44 so as to provide a hermetic seal therewith. The outer peripheral edge 45 of the base portion 23 and the adjacent inner peripheral edge 44 of the end of the housing 24 are rounded slightly to form an annular cavity or groove in the assembled structure which is filled with the cement 28. The cement of the preferred type, and which has been described hereinbefore, will adhere rigidly to the surfaces of both parts 23 and 24, securely joining them together, and will also prevent entrance of air or moisture into the interior of the housing.

Figure 8:
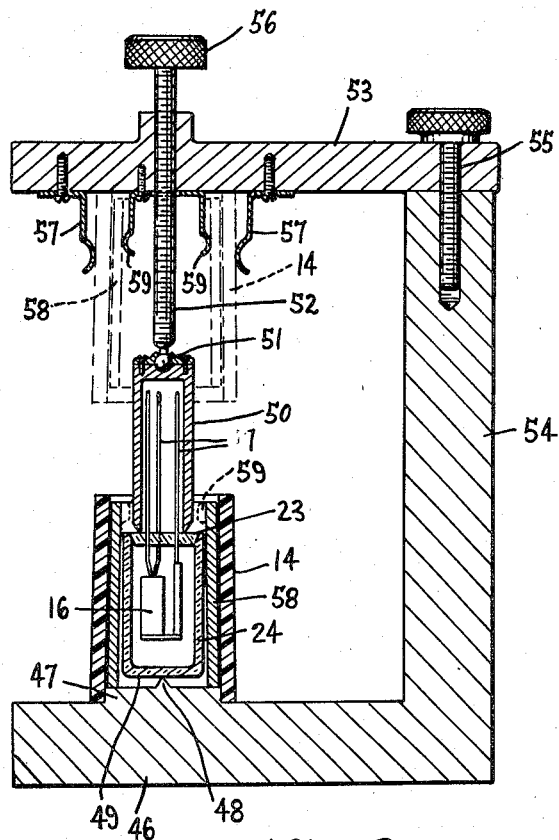
Fig. 8 is a sectional side elevational view of a modification of the device.

It is apparent that with a structure of this type it is advisable to invert the housing 24 when assembling the base portion 23 therewith. This may be done in a device such as illustrated in Fig. 8 which comprises a base 46 which is provided with a circular raised seat 47 having an outer wall which tapers slightly upwardly and inwardly and having a point bearing 48 thereon. The top surface 49 of the glass housing 24 is located on the point bearing 48. The base portion 23, which has previously been provided with the leads 17 having the crystal 16 attached thereto, is positioned in desired relation with the open end of the housing 24 and a pressure member 50 is then brought into engagement with the base portion 23. The pressure member 50 comprises a hollow cylindrical member which is of sufficient length to enclose the leads 17 and which has its lower end in annular line or area contact with the base portion 23 in encircling relation with the leads. The lower end of the pressure member 50 may be beveled to provide a lesser area of engagement if desired.

The upper end of the pressure member 50 is connected by a universal bearing connection 51 to the lower end of a shaft 52 which is threadedly mounted in an arm 53 which extends in spaced overlying relation to the lower portion of the base 46 and which is removably secured to an upright portion 54 of the base 46 by means such as a pivot stud 55 or the like. Thus, to provide the desired degree of pressure upon the base portion 23 when assembling it with the housing 24, the shaft 52 is threaded downwardly in the arm 53 by manual rotation of a knob 56 carried on the upper end thereof whereupon the pressure member 50 will be moved into engagement with the base portion 23. It is apparent that the universal bearing connection 51 will prevent rotary movement of the shaft 52 from being transmitted to the pressure member 50 which might cause an undesirable effect upon the base portion 23.

At this time the cement 28 may be brushed or otherwise applied to join the base portion 23 to the housing 24.

After the cement 28 has become hardened, a nylon or metal shell or casing 14 having an inner wall tapering upwardly and slightly inwardly is provided to enclose the glass housing. To accomplish this the nylon or metal sleeve 14 is placed in spaced encircling relation with the housing 24. The sleeve 14 is initially retained in the device by spring clip 57 carried by the arm 53, during the cementing operation, in raised position adjacent the under side of the arm 53 as shown by dot-dash lines in Fig. 8. The operator is merely required to slide the sleeve 14 downwardly to remove it from the spring clips 57 and to position the lower end thereof intimately over the tapered raised seat 47. At this time, the molten metal alloy can be poured into the space within the sleeve 14 whereupon it will flow about the glass housing 24. The annular engagement of the pressure member 50 with the base portion 23 will, however, prevent the metal from coming into contact with the leads 17.

A further modified method of providing the glass housing 24 with a metal casing is shown in Fig. 8 and comprises a sleeve 58 which is formed of the desired low melting alloy and which is positioned internally of the sleeve 14 in encircling relation with the glass housing 24. The metal sleeve 58 is also adapted to be held in raised position during the application of the cement by spring clips 59 also carried by the arm 53 and which function to retain the metal sleeve 58 within the sleeve 14, as shown by dot-dash lines. After the sleeve 14 has been positioned upon the base 46 the low melting metal sleeve 58 can be lowered into position therewithin. Then upon application of sufficient heat, which is first controlled to be approximately 110° C., which may be done by inserting the device in an oven or by other suitable heating means will first cause the cement to respond to said heat and harden and seal the base 23 to the housing 24. The heat is then increased to approximately 135° C. whereupon the metal sleeve 58 will melt and flow into closely interfitting relation with the outer surface of the glass housing 24. It is particularly pointed out that the size of the sleeve 58 is such as to provide an amount of molten metal sufficient to completely cover the housing. It may be desired to provide the metal sleeve 58 with thickened upper end portions 59 as shown by dot lines in Fig. 8 in order to provide sufficient material to provide a shell or casing of the desired thickness.

After the metal casing has been formed in the selected manner the outer sleeve 14 is raised and the knob 56 is operated to relieve pressure from the base portion 23 whereupon the completed device may be removed from the base 46. The sleeve 14 is tapered internally to permit ease in separating it from the casing. To conceal or cover the small opening in the metal casing which was made by the point bearing 48 or 41a, it is merely necessary to use a hot metal instrument to superficially heat some of the adjacent alloy of the casing to cause it to flow and close said opening.

If desired, an opaque plastic material can be applied to the exposed areas of the base portion 23 instead of the metal to prevent entrance of light into the interior of the device.

The metal casing or shell provides the device with increased strength and protection. When a plastic coating is used it is preferably applied by dipping the housing and base assembly into an opaque plastic material whereupon the entire outer surface of the glass housing 24 and base portion 23 may be coated. The selected opaque plastic material, of course, may be applied by other methods such as spraying, brushing or the like.

It is also to be understood that if desired the cement 28 may be omitted wherein the subsequent metal casing will function to maintain the external parts of the device in sealed assembled relation. However, this requires that the glass housing 24 and base 18 or 23 be held under pressure in intimate sealed relation with each other prior and during the forming of the outer metal coating thereon.

From the foregoing description it will be apparent that simple, efficient and novel means and method have been provided for enclosing a germanium crystal or the like in a protective casing to form a transistor which is substantially unaffected by heat, oxygen, moisture or light.

It will also be apparent that changes may be made in the details of construction, arrangement of parts and methods shown and described without departing from the spirit of the invention as expressed in the accompanying claims. Therefore, it is to be understood that all matter set forth or shown in the accompanying drawings is to be interpreted as illustrative and not in a limiting sense.

I claim:

1. A device of the character described comprising a crystal affective by atmospheric conditions and having at least one lead connected thereto, an open end glass housing enclosing said crystal, and a glass base sealing the open end of said glass housing and carrying leads which are attached to the leads connected to the crystal, the peripheral edges of said open end of the housing and the base being shaped to have intimate contact with each other, one of said interfitting peripheral edges being provided with a flat bevel and the other thereof being provided with a rounded surface adapted to engage said flat bevel and to form a continuous line of contact therewith with an open space between said edges to the outer side of said line of contact, said base being relatively irremovably affixed to the open end of said housing by a substantially moisture-resistant cement disposed within the space between the adjacent peripheral edges externally of said line of contact therebetween, said cement being formed of a composition containing a controlled amount of the polymer of diethylene glycol and maleic acid crosslinked with diallyl phthalate having added thereto an amount of hydrophobic plasticizer compatible therewith over a wide range of temperatures, said line of contact forming a barrier whereby said cement is prevented from access to the interior of said housing and a casing of a metal alloy having a low melting point of approximately 135° C. in intimate engagement with and enclosing said housing and base in the area of the cement to prevent moisture and atmosphere from gaining access to said cement.

2. A casing for an electrical device comprising an open end glass housing and a glass base sealing the open end of said glass housing, the peripheral edges of said open end of the housing and the base being shaped to meet with each other, one of said peripheral edges being provided with a flat bevel and the other thereof being provided with a rounded surface adapted to engage said flat bevel and to form a continuous line of contact therewith with an open space between said edges and externally of the line of contact, said base being relatively irremovably affixed to the open end of said housing by a substantially moisture-resistant cement disposed within the space between the adjacent peripheral edges externally of said line of contact therebetween, said cement being formed of a composition containing a controlled amount of the polymer of diethylene glycol and maleic acid cross-linked with diallyl phthalate having added thereto an amount of hydrophobic plasticizer compatible therewith over a wide range of temperatures, said line of contact forming a barrier whereby said cement is prevented from access to the interior of said housing, and a metal coating of indium and tin enclosing said housing and base in the area of said cement to prevent moisture and atmospheres from gaining access to said cement.

3. A casing for an electrical device comprising an open end glass housing and a glass base sealing the open end of said glass housing, the peripheral edges of said open end of the housing and the base being shaped to meet with each other, one of said peripheral edges being provided with a flat bevel and the other thereof being provided with a rounded surface adapted to engage said flat bevel and to form a continuous line of contact therewith with an open space between said edges to the outer side of said line of contact, said base being relatively irremovably affixed to the open end of said housing by a substantially moisture-resistant cement disposed within the space between the adjacent peripheral edges externally of said line of contact therebetween, said cement being formed of a composition containing a controlled amount of the polymer of diethylene glycol and maleic acid cross-linked with diallyl phthalate having added thereto an amount of hydrophobic plasticizer compatible therewith over a wide range of temperatures, said line of contact forming a barrier whereby said cement is prevented from access to the interior of said housing, a coating of low melting metal alloy of indium and tin enclosing said housing and base in the area of said cement to prevent breakdown of the cement, and an opaque non-metallic plastic coating covering the portions of the housing and base uncovered by said metal casing to prevent light from entering the interior of said housing.

References Cited in the file of this patent

UNITED STATES PATENTS

| 2,250,183 | Miller | July 22, 1941 |
| 2,443,738 | Kropa | June 22, 1948 |
| 2,444,312 | Roberds | June 29, 1948 |
| 2,504,504 | Despois | Apr. 18, 1950 |
| 2,593,846 | Clack | Apr. 22, 1952 |

FOREIGN PATENTS

| 1,033,294 | France | Apr. 1, 1953 |